US010174155B2

(12) United States Patent
Hu et al.

(10) Patent No.: US 10,174,155 B2
(45) Date of Patent: *Jan. 8, 2019

(54) OXYGEN SCAVENGING COPOLYMERS MADE FROM CYCLIC ALIPHATIC MONOMERS

(71) Applicant: PolyOne Corporation, Avon Lake, OH (US)

(72) Inventors: Ling Hu, Westlake, OH (US); Roger W. Avakian, Solon, OH (US)

(73) Assignee: PolyOne Corporation, Avon Lake, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/443,189

(22) Filed: Feb. 27, 2017

(65) Prior Publication Data

US 2017/0166692 A1    Jun. 15, 2017

Related U.S. Application Data

(63) Continuation of application No. 14/403,554, filed as application No. PCT/US2013/042200 on May 22, 2013, now Pat. No. 9,617,375.

(60) Provisional application No. 61/651,755, filed on May 25, 2012.

(51) Int. Cl.
| | |
|---|---|
| *C08G 63/08* | (2006.01) |
| *B65D 81/26* | (2006.01) |
| *C08L 67/06* | (2006.01) |
| *B65D 81/28* | (2006.01) |
| *B65D 85/00* | (2006.01) |

(52) U.S. Cl.
CPC ........... *C08G 63/08* (2013.01); *B65D 81/266* (2013.01); *B65D 81/28* (2013.01); *B65D 85/70* (2013.01); *C08L 67/06* (2013.01); *C08G 2390/00* (2013.01); *C08L 2201/08* (2013.01); *C08L 2203/10* (2013.01)

(58) Field of Classification Search
CPC .. C08L 53/00; C08L 67/04; C08F 8/00; C08F 8/14; C08F 8/16
USPC ........................................................ 525/386
See application file for complete search history.

(56) References Cited

U.S. PATENT DOCUMENTS

| | | | |
|---|---|---|---|
| 3,598,799 A | * | 8/1971 | Naylor ................ C08G 18/4269 525/111 |
| 3,649,716 A | * | 3/1972 | Childers et al. ....... C08G 63/08 525/186 |
| 3,789,084 A | | 1/1974 | Childers |
| 4,130,546 A | * | 12/1978 | Goto .................... C08G 18/003 525/111 |
| 4,603,171 A | * | 7/1986 | Hsieh ..................... C08G 63/08 525/105 |
| 5,049,624 A | | 9/1991 | Adams et al. |
| 5,159,005 A | | 10/1992 | Frandsen et al. |
| 5,231,161 A | | 7/1993 | Brunelle et al. |
| 5,281,669 A | | 1/1994 | Kambour et al. |
| 5,346,644 A | | 9/1994 | Speer et al. |
| 5,350,622 A | | 9/1994 | Speer et al. |
| 5,399,289 A | | 3/1995 | Speer et al. |
| 5,407,984 A | | 4/1995 | Brunelle et al. |
| 5,527,976 A | | 6/1996 | Takekoshi et al. |
| 5,529,833 A | | 6/1996 | Speer et al. |
| 5,591,800 A | | 1/1997 | Takekoshi et al. |
| 5,605,996 A | | 2/1997 | Chuu et al. |
| 5,639,815 A | | 6/1997 | Cochran et al. |
| 5,660,761 A | | 8/1997 | Katsumoto et al. |
| 5,668,186 A | | 9/1997 | Brunelle et al. |
| 5,700,554 A | | 12/1997 | Speer et al. |
| 5,756,644 A | | 5/1998 | Hodge et al. |
| 5,776,361 A | | 7/1998 | Katsumoto et al. |
| 5,955,527 A | | 9/1999 | Cochran et al. |
| 6,083,585 A | | 7/2000 | Cahill et al. |
| 6,225,404 B1 | | 5/2001 | Sorenson et al. |
| 6,254,803 B1 | | 7/2001 | Matthews et al. |
| 6,254,804 B1 | | 7/2001 | Matthews et al. |
| 6,255,248 B1 | | 7/2001 | Bansleben et al. |
| 6,323,288 B1 | | 11/2001 | Ching et al. |
| 6,346,308 B1 | | 2/2002 | Cahill et al. |
| 6,365,247 B1 | | 4/2002 | Cahill et al. |
| 6,406,766 B1 | | 6/2002 | Rotter et al. |
| 6,420,047 B2 | | 7/2002 | Winckler et al. |
| 6,420,048 B1 | | 7/2002 | Wang |
| 6,436,548 B1 | | 8/2002 | Phelps |
| 6,436,549 B1 | | 8/2002 | Wang |
| 6,506,463 B1 | | 1/2003 | Cahill et al. |
| 6,509,436 B1 | | 1/2003 | Cahill et al. |
| 6,544,611 B2 | | 4/2003 | Schiraldi et al. |
| 6,558,762 B2 | | 5/2003 | Cahill et al. |
| 6,569,506 B1 | | 5/2003 | Jerdee et al. |

(Continued)

FOREIGN PATENT DOCUMENTS

| | | | |
|---|---|---|---|
| JP | 2002020601 A | * | 1/2002 |
| JP | 2005281424 A | * | 10/2005 |

OTHER PUBLICATIONS

Machine Translated English language equivalent of JP 2005-281424 (Oct. 2005, 10 pages).*
Machine Translated English language equivalent of JP 2002-020601 (Jan. 2002, 4 pages).*
BASF website, Joncryl ADR-4368C data sheet available at http://www2.basf.us/additives/pdfs/4368C_TDS.pdf (Jan. 25, 2008).
Bernquist et al, "Advances in waterborne UV coatings" (2006).
Espacenet Abstract for JP2000103911 (A) Apr. 11, 2000.
Espacenet Abstract for JP2000119496 (A) Apr. 25, 2000.
Espacenet Abstract for JP2001234042 (A) Aug. 28, 2001.
Espacenet Abstract for JP2001234427 (A) Aug. 31, 2001.

(Continued)

*Primary Examiner* — Catherine S Branch
(74) *Attorney, Agent, or Firm* — John H. Hornickel

(57) ABSTRACT

A method and system for oxygen molecule scavenging is disclosed. The system employs as a novel copolymer as the reducing agent for oxygen molecules. The copolymer is the polymerization product of cyclic aliphatic monomer and unsaturated functional polymer.

16 Claims, No Drawings

(56) References Cited

U.S. PATENT DOCUMENTS

| | | |
|---|---|---|
| 6,572,783 B1 | 6/2003 | Cai et al. |
| 6,605,681 B1 | 8/2003 | Villalobos et al. |
| 6,607,795 B1 | 8/2003 | Yang et al. |
| 6,610,215 B1 | 8/2003 | Cai et al. |
| 6,639,009 B2 | 10/2003 | Winckler et al. |
| 6,713,601 B2 | 3/2004 | Phelps |
| 6,776,924 B2 | 8/2004 | Walters et al. |
| 6,863,988 B2 | 3/2005 | Tibbitt et al. |
| 6,908,652 B1 | 6/2005 | Miranda |
| 6,946,175 B2 | 9/2005 | Yang et al. |
| 6,984,694 B2 | 1/2006 | Blasius, Jr. et al. |
| 6,994,914 B2 | 2/2006 | Winckler et al. |
| 7,049,359 B2 | 5/2006 | Cochran et al. |
| 7,056,565 B1 | 6/2006 | Cai et al. |
| 7,097,890 B1 | 8/2006 | Ching et al. |
| 7,141,182 B2 | 11/2006 | Walters et al. |
| 7,214,415 B2 | 5/2007 | Tibbitt et al. |
| 7,226,973 B2 | 6/2007 | Fonseca et al. |
| 7,323,519 B2 | 1/2008 | Kitano et al. |
| 7,326,361 B2 | 2/2008 | Walters et al. |
| 7,399,808 B2 | 7/2008 | Walters et al. |
| 7,411,021 B2 | 8/2008 | Zhang et al. |
| 7,504,045 B2 * | 3/2009 | Speer ............... A23L 3/3436 252/181.1 |
| 7,691,290 B2 | 4/2010 | Deshpande et al. |
| 7,745,561 B2 | 6/2010 | Bahr et al. |
| 7,754,798 B2 | 7/2010 | Ebner et al. |
| 7,781,534 B2 | 8/2010 | Kitano et al. |
| 7,879,930 B2 | 2/2011 | Liu |
| 7,968,657 B2 | 6/2011 | Avakian |
| 8,476,400 B2 | 7/2013 | Joslin et al. |
| 8,708,992 B2 | 4/2014 | Kobayashi et al. |
| 8,871,352 B2 | 10/2014 | Joslin et al. |
| 8,921,487 B2 | 12/2014 | Hu et al. |
| 9,617,375 B2 * | 4/2017 | Hu ..................... C08G 63/08 |
| 2002/0022099 A1 | 2/2002 | Schmidt et al. |
| 2002/0102424 A1 | 8/2002 | Yang et al. |
| 2008/0119619 A1 | 5/2008 | Mullen |
| 2008/0171169 A1 | 7/2008 | Liu |
| 2008/0255280 A1 | 10/2008 | Sims et al. |
| 2009/0028841 A1 | 1/2009 | Gohil |
| 2009/0029078 A1 | 1/2009 | Gohil |
| 2009/0110859 A1 * | 4/2009 | Larson, Jr. ............. C08L 67/04 428/36.9 |
| 2010/0036054 A1 | 2/2010 | Hutchings et al. |
| 2010/0279048 A1 * | 11/2010 | Stewart ............... C09K 15/06 428/36.92 |
| 2011/0111951 A1 | 5/2011 | Joslin et al. |
| 2012/0070545 A1 | 3/2012 | Hu et al. |
| 2017/0121085 A1 * | 5/2017 | Ichikawa ............... B65D 41/04 |

OTHER PUBLICATIONS

Espacenet Abstract for JP2001234429 (A) Aug. 31, 2001.
Espacenet Abstract for JPH10195285 (A) Jul. 28, 1998.
Espacenet Abstract for JPS59196323 (A) Nov. 7, 1984.
Karayan, "'As Good As New' Chain Extender Restores Reclaimed Resins," Plastics Technology (Feb. 2007).
Patent Abstract of Japan for JPH09003178 Jan. 7, 1997.
Villalobos et al., "Oligomeric chain extenders for economic reprocessing and recycling of condensation plastics" (2006).
Nojima, S. et al.: "Morphology formed in binary blends of poly(e-caprolactone) and e-caprolactone-butadiene diblock copolymer." Polymer, Elsevier Science Ltd, vol. 36, No. 14 Jan. 1, 1995, pp. 2853-2856, XP004025716.
Na-Youn, K et al. "Enhanced Impact Properties of Polylactide by Poly(lactide-b-butadiene-b-lactide) Triblock Copolymer" Macromolecular Research, vol. 19, No. 9 2011-08012, pp. 943-947, XP055087540.
Machine translated English Language of JP 2002020601 (Jan. 2002, 4 pages).
Machine translated English Language of JP 2005281424 (Oct. 2005, 10 pages).

* cited by examiner

US 10,174,155 B2

OXYGEN SCAVENGING COPOLYMERS MADE FROM CYCLIC ALIPHATIC MONOMERS

CLAIM OF PRIORITY

This application claims priority from U.S. Provisional Patent Application Ser. No. 61/651,755 filed on May 25, 2012, which is incorporated by reference.

FIELD OF THE INVENTION

This invention relates to use of novel copolymers, functioning as reducing agents, also known as anti-oxidants, to scavenge for oxygen within containers and packaging made from thermoplastic compounds.

BACKGROUND OF THE INVENTION

Spoilage of food has plagued humanity for millennia. Containers for food have evolved from stone to ceramic to metallic to glass to plastic, particularly for single serving consumable foods and beverages.

Shelf life of foods and beverages is affected by oxidation from oxygen molecules within the volume of the container not occupied by the food or beverage ("headspace oxygen"), within the bulk of the container walls ("inherent oxygen"), and permeating through the container walls or closure ("permeated oxygen"). Also the food or beverage itself contains oxygen which equilibrates in the headspace.

U.S. Patent Application Publication US2012100263 discloses a method and system for oxygen molecule scavenging. The system employs a novel terpolymer as the reducing agent for oxygen molecules. The terpolymer is the polymerization product of macrocyclic poly(alkylene dicarboxylate) oligomer, unsaturated functional polymer, and epoxy-functional styrene-acrylate oligomer. This terpolymer is particularly well suited for use in polyester resins.

SUMMARY OF THE INVENTION

What the art needs is another system for scavenging for oxygen molecules within thermoplastic compounds in addition to polyester, preferably after the compounds are formed into plastic articles and especially for those compounds which are permeable to oxygen.

One aspect of the invention is a copolymer having carbon-carbon unsaturated bonds susceptible to reaction with oxygen molecules, comprising a polymerization product of cyclic aliphatic monomer and unsaturated functional polymer.

Another aspect of the invention is a thermoplastic compound, comprising a thermoplastic polymer matrix and a copolymer functioning as a reducing agent for oxygen molecules.

Another aspect of the invention is a thermoplastic article, comprising the thermoplastic compound, such as a bottle pre-form, a blow-molded bottle, a bottle containing a perishable food or beverage susceptible to oxidation, any other shape of food container or plastic food packaging, or any other packaging or storage media for containing oxygen-sensitive materials.

Another aspect of the invention is a method for scavenging for oxygen within a thermoplastic article, comprising the steps of mixing a reducing agent for oxygen molecules into a thermoplastic compound and forming an article from the thermoplastic compound, wherein the reducing agent is a copolymer described above and wherein the copolymer has carbon-carbon unsaturated bonds susceptible to reaction with oxygen molecules.

EMBODIMENTS OF THE INVENTION

Thermoplastic Matrix of the Plastic Article

Any thermoplastic can be a candidate forming into a plastic article. While principally the invention serves the perishable food and beverage industry, plastic articles made from the thermoplastic compounds of the present invention can also be used in any industrial or consumer industry which needs to minimize the presence of oxygen because of its corrosive effects. For example, the electronics industry may have a need to limit the presence of oxygen in an enclosed space to minimize oxidation of expensive metals on electronic components within that enclosed space.

Mostly however, the plastic articles are intended to serve as packaging for perishable food or beverage. The ultimate plastic packaging article into which the thermoplastic matrix is formed by molding, extruding, calendering, etc. and what that ultimate article might contain or protect determine the suitability of use of that thermoplastic in the present invention.

Non-limiting examples of thermoplastics benefiting from the invention are polyesters (including polylactides and polyhydroxyalkanoates), polyamides, polyolefins, polycarbonates, polystyrenes, polyacrylates, polyvinyl halides, thermoplastic elastomers (including thermoplastic vulcanizates) of all types, and the like.

Because the shelf-life of consumable foods and beverages needs protection from the oxidating effect of reactions with oxygen molecules within or penetrating the containers for such foods and beverages, the selection of the thermoplastic to be used in the present invention is predicated on packaging cost, appearance, and other packaging considerations.

Of the polymeric candidates, polyesters and polyethylene are preferred as packaging materials. Of them, polyesters, particularly polyethylene terephthalate (PET) is used as plastic beverage containers of both carbonated and non-carbonated consumables. Additionally, thermoplastic elastomers are preferred for use as closures or closure liners or gaskets or seals with the packaging materials such as a plastic beverage container.

More recently, because of the desire for renewable resources to be used in food packaging and other consumables, polylactides can benefit from the copolymer of the present invention.

Reducing Agent for Oxygen Molecules

Once the thermoplastic matrix is selected for the packaging, then the reducing agent for oxygen molecules can be selected. The reducing agent for the present invention is a novel copolymer formed from monomers and polymers selected for specific reasons as explained below.

Base Component

The base component of the copolymer is selected to be the same as, or to be compatible with, the thermoplastic matrix which is to be formed into the plastic packaging article.

The base component can be a cyclic monomer capable of a ring-opening polymerization.

Non-limiting examples of cyclic monomers include lactide (lactic acid dimer), glycolide (glycolic acid dimer), propriolactone (having 3 carbon atoms ($C_3$)), butyrolactone ($C_4$), valerolactone ($C_5$), caprolactone ($C_7$), cyclic carbonates, lactams, azlactones, and combinations thereof.

Collectively, these cyclic monomers will be identified as "cyclic aliphatic monomers" in this document.

Cyclic aliphatic monomers differ from the aromatic cyclic terephthalate used in US2012100263 and provide advantages such as producing a liquidic or soft wax solid copolymer at ambient temperatures and pressure. Compared with solid pellets of the terpolymer of US2012100263, a user of the copolymer can dispense and disperse some of the copolymers of the present invention with liquidic metering equipment.

The cyclic aliphatic monomer as the base component provides compatibility of the reducing agent with the thermoplastic matrix. A person having ordinary skill in the art can use such resources as *Hansen Solubility Parameters: A User's Handbook* (CRC Press, 2007) in order to identify thermoplastic matrices which are compatible with any particular cyclic aliphatic monomer useful in this invention.

Preferred and commercially available cyclic aliphatic monomers include lactide which is very compatible for use in polylactide (PLA) and polyester (PET, PTT, PBT) plastic articles or epsilon-caprolactone (ε-caprolactone), which is very compatible with polycarbonate, polyvinyl chloride, and those listed for lactides.

Lactide is 3,6-dimethyl-1,4-dioxane-2,5-dione (CAS No. 95-96-5) and is sold as a white powder from such commercial sources as Sigma-Aldrich and Purac, both well known multi-national companies. Lactide has a chemical structure seen as Formula I:

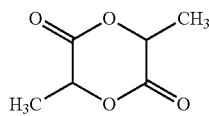

I

Epsilon-caprolactone is 2-oxepanone or 6-hexanolactone (CAS No. 502-44-3) and is sold as a colorless liquid from such commercial sources as Sigma-Aldrich. Epsilon-caprolactone has a chemical structure as seen as Formula II:

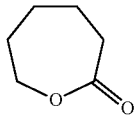

II

Unsaturated Polymeric Reducing Component

The copolymer next includes the unsaturated polymeric reducing component. Any molecule that is an unsaturated functional polymer, i.e., any monomer or oligomer or functionalized polymer, which retains carbon-carbon unsaturation (including either double or triple bonds) after polymerization of the copolymer is a candidate for use in the copolymer.

Non-limiting examples of unsaturated functional polymeric reducing components include hydroxyl- or glycidyl-functional polyalkenes or polyalkynes, such as a hydroxyl-terminated polybutadiene or an epoxy functionalized hydroxyl-terminated polybutadiene. Of these examples, a commercially available hydroxyl-terminated polybutadiene is preferred because it is a colorless liquid amenable to use in reactive extrusion polymerization and has a number average molecular weight of about 2800 with approximately 20% of the backbone being vinyl double bonds (CAS #69102-90-5).

It has also been found, unexpectedly, that the molecular weight of the unsaturated functional polymeric reducing component affects performance of the copolymer as an oxygen scavenger. Hydroxyl-terminated polybutadiene having a number average molecular weight of about 1300 with approximately 20% of the backbone being vinyl double bonds fails to provide the resulting copolymer with oxygen scavenging capacity, all other factors being the same. Therefore, the invention prefers a number average molecular weight (Mn) of more than 1400 and preferably at least about 2800.

As of the filing of this patent application, there is no commercial hydroxyl-terminated polybutadiene available with a number average molecular weight between about 1400 and 2800. But hereafter, the scope of this invention shall be deemed to have included such unsaturated functional polymeric reducing components having a Mn greater than about 1400 which react to form a copolymer which does have oxygen scavenging capacity.

Formula III shows hydroxyl-terminated polybutadiene, wherein n should be greater than 25.

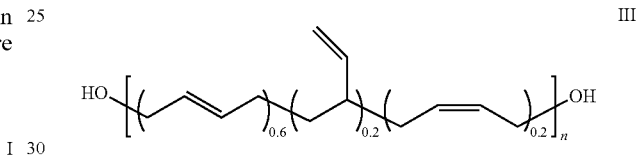

III

Copolymers synthesized in the present invention are macromolecules capable of reacting with oxygen molecules and scavenge for those oxygen molecules at the surface of the article in which such macromolecules reside and within the bulk of the wall itself. A benefit of use of macromolecular copolymers is that they are not themselves volatile or mobile within the volume contained by thermoplastic article holding the food or beverage. Macromolecules do not migrate from the thermoplastic compound.

The combination of the base component, the unsaturated functional polymeric reducing component, and the linking component to form the copolymer makes it suitable for use in this invention because the copolymer is compatible with the thermoplastic matrix of the plastic article in order to provide good dispersion therein. Alternatively, the copolymer has good compatibility at a molecular level with the thermoplastic matrix to optimize clarity and translucency. Most preferably, the copolymer is miscible with the thermoplastic matrix.

The oxygen scavenging properties of the copolymer arise from the presence of carbon-carbon unsaturated bonds remaining as an unreacted part of the unsaturated functional polymeric reducing component after polymerization of the copolymer. These carbon-carbon unsaturated bonds are susceptible to reaction with oxygen molecules. Indeed, whereas other uses of such macromolecules as polymers might be seen as decaying in the presence of oxygen, their use as an oxygen scavenging additive to the thermoplastic matrix is beneficial in the present invention.

Reaction to Form Copolymer

The copolymer benefits from catalysis of the two components during polymerization. A commercially available catalyst can be used. Presently preferred is an organic titanate such as titanium tetrakis(2-ethylhexanolate) (CAS No. 1070-10-6) or organic stannate such as dibutyltin dibutoxide (CAS No. 3349-36-8).

The copolymer can accommodate a wide variety of amounts of both components, but it has been found that a plurality, and preferably a majority of unsaturated functional polymeric component is preferred because the oxygen scavenging capacity is directly related to the number of unreacted carbon-carbon unsaturated bonds available for reducing oxygen and eliminating it from the interior volume of the plastic packaging article.

The copolymer is macromolecular and not susceptible to migration or "blooming" from the bulk of the plastic article to a surface of the plastic article but have unsaturated carbon-carbon moieties which are vulnerable to oxidation by free oxygen molecules which come into contact with them, whether within the bulk of the plastic packaging article wall or on the surface of that wall. In effect, this vulnerability becomes the reducing agent of the macromolecular copolymer and each oxygen molecule—unsaturated carbon bond reaction is a scavenging event for mobile oxygen molecules within a food or beverage container or package made using copolymers of the present invention Table 1 shows the relative weight percents of acceptable, desirable, and preferred ingredients for the copolymer. The copolymer can comprise, consist essentially of, or consist of the following ingredients.

TABLE 1

Copolymer (Wt. %)

| Component | Acceptable | Desirable | Preferable |
|---|---|---|---|
| Base Component (Cyclic Aliphatic Monomer) | 30-70% | 35-65% | 40-60% |
| Unsaturated Functional Polymeric Reducing Component (Mn > 1400) | 30-70% | 35-65% | 40-60% |
| Catalyst | 0.5-1.5% | 0.75-1.25% | 0.75-1.25% |

Polymerization of the Copolymer

The polymerization of the copolymer can occur in batch or continuous operations.

Polymerization in a continuous process typically occurs in an extruder that is elevated to a temperature that is sufficient to melt the base component with addition of the unsaturated functional polymer such as liquid hydroxyl-terminated polybutadiene, the linking component, and the polymerization catalyst at the head of the extruder. Extruder speeds can range from about 20 to about 600 revolutions per minute (rpm), and preferably from about 500 to about 550 rpm, but exact conditions will depend upon extruder diameter, length/distance ratio, etc. For example, a 16 mm Prism twin screw extruder should operate at about 50-75 rpm, whereas an 18 mm Leistritz twin screw extruder should operate at 500-550 rpm. Typically, the output from the extruder is pelletized for compounding with the thermoplastic matrix of the plastic packaging article.

Mixing in a batch process typically occurs in a Banbury mixer that is also elevated to a temperature that is sufficient to melt the base component to permit excellent mixing and reaction with the other two components. The mixing speeds range from 60 to 1000 rpm. Also, the output from the mixer is chopped into smaller sizes for later compounding as explained above.

Polymerization yields at least about 93% copolymer, having a weight average molecular weight (Mw) of about 15,000-20,000, a number average molecular weight (Mn) of about 8,500-10,000, and a polydispersity of from about 1.8 to about 2.2, all measured via Gel Permeation Chromatography (GPC) using polystyrene as a test reference using Tetrahydrofuran as the solvent. The copolymer was found via Differential Scanning calorimetry (DSC) to have different glass transition temperatures (Tg) and melting temperatures (Tm) depending on the type of cyclic aliphatic monomer employed.

Copolymers of lactide monomer were liquids having two Tg values but no Tm, surprising even though the lactide monomer itself is a solid.

Copolymers of epsilon-caprolactone monomer were waxy solids having one Tg value and a Tm of about 47° C., surprising also because the epsilon-caprolactone itself is a liquid.

Masterbatches of the Copolymer

The copolymer can function as a masterbatch or concentrate for addition to the thermoplastic matrix and other ingredients at the time of injection molding to form a plastic article. If used as a masterbatch, the copolymer can serve as a carrier for other ingredients, such as catalysts, colorants, and other functional additives. Formation of masterbatches in which the carrier is an active ingredient to the final plastic article is a technique well known to a person having ordinary skill in the art. Masterbatches of the copolymer are preferred in order that the copolymer does not undergo another "heat history" during melt compounding into the thermoplastic matrix.

Compounds of the Copolymer in the Thermoplastic Matrix

The copolymer can be mixed into the thermoplastic matrix alone, but the compound preferably benefits from the use of an oxidation catalyst, one that assists the reduction reaction with oxygen.

Indeed, when a catalyst is to be used, it is possible for the catalyst to be pre-mixed into the thermoplastic matrix before compounding with the copolymer or pre-mixed into a masterbatch carrier before molding with the copolymer and the thermoplastic matrix.

Oxidation Catalyst for Reducing Component of the Copolymer

Catalysts can help activate the unsaturated reducing agent component of the copolymer. Catalysts are not required, but they are preferred. If present, they can be photo-activated catalysts, moisture-activated catalysts, heat-activated catalysts, etc., all well known to a person having ordinary skill in the art.

Copolymers of the invention can proceed in the scavenging for oxygen without the need for catalysis. For example, packaging which is formed at or near the same time as the filling of that packaging with food or beverage can benefit from such oxygen scavenging agents that do not need activation to begin reducing oxygen molecules.

However, for one particular industry, it is quite important for the copolymer, functioning as the reducing agent for oxygen molecules, to remain dormant until package or container formation. Beverage bottles and other liquid containers are often made in two steps, one to form a so-called "pre-form" which has the final dimensions of the opening but is collapsed with respect to the final volume; and the second to mold the pre-form into a container, vessel, or bottle of final dimensions. For example, water, soft drink, and beer bottles start as pre-forms with the proper dimensions of the screw cap mouth and a highly collapsed remainder resembling a deflated bottle or a truncated test tube. At the bottling factory, the pre-forms are expanded by blow molding to form liter or half liter bottles just prior to beverage filling.

The relative dormancy of the oxygen scavenging function of the copolymer is important for the beverage industry because one does not want to waste the oxygen scavenging properties on a pre-form exposed to the environment during storage, prior to blow molding and filling. Therefore, for this industry in particular, and any other which relies on pre-forms, such as the health care or cosmetics industries, the onset of oxygen scavenging needs to be triggered by an event after the formation of the pre-form.

Non-limiting examples of catalysts are transition metals (heat-activated) and benzophenones (photo-activated). The concentration of catalyst relative to copolymer can be as little as 10 parts per million of copolymer to contribute to oxygen scavenging.

Of the catalysts, transition metal salts are most preferred because they are thermally activated. Such salts include those of cobalt, cerium, manganese, etc. These types of catalysts are suitable for activation of the copolymer to function as a macromolecular oxygen reducing agent at the time of formation of the pre-form into a blow-molded bottle, which happens at elevated heat to melt the pre-form for ultimate shaping.

A non-limiting example of a commercially available catalyst is cobalt stearate (CAS #13586-84-0) to serve as a catalyst for the oxidation of the oxidizable organic compounds.

Optional Additives

The plastic article used as food or beverage packaging or oxygen sensitive electronic components can include conventional plastics additives in an amount that is sufficient to obtain a desired processing or performance property for the thermoplastic compound comprising the thermoplastic matrix, the reducing agent for oxygen molecules, and optionally the oxidation catalyst for the reducing agent. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppresants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them. If the compound is to be used as a plastic article in any regulated industry, a person having ordinary skill in the art would know to select only those optional additives which are suitable for the regulated end use.

Table 2 shows the relative weight percents of acceptable, desirable, and preferred ingredients for compounds of the present invention which have been combined from master-batches at the time of injection molding or before as pre-mixed compounds. Either way, Table 2 shows the formulation parameters of the compound in the form of the final plastic article.

TABLE 2

Formulation Parameters

Weight Percents, except as noted

| | Acceptable | Desirable | Preferred |
|---|---|---|---|
| Thermoplastic Matrix | 84-99% | 89-97% | 94-99 |
| Reducing Agent for Oxygen Molecules (Copolymer) | 0.1-3% | 0.1-2% | 0.1-1% |
| Optional Reducing Metal Agent Catalyst | 10-1000 ppm | 10-400 ppm | 10-200 ppm |
| Other Optional Additives | 0-15% | 0-10% | 0-5% |

USEFULNESS OF THE INVENTION

As explained previously, any thermoplastic article which is designed to contain contents which are susceptible to oxidation can benefit from the macromolecular, non-migrating, novel copolymers functioning as oxygen scavengers which become a part of the article in its final form. The industry benefiting from compounds of the present invention, including its novel copolymers, can range from highly regulated food and beverage industries to highly regulated high performance electronic industries.

It is known that oxygen can react with flavors, dyestuffs, amino acids, vitamins, fatty acids, anti-oxidants (present for other purposes), and other sensitive organic chemicals. Oxygen can transform enzymes and promote the growth of any aerobic process including the propagation of yeast, mold, or bacteria.

Any food or beverage, medicament or cosmetic, or any other material highly reactive with oxygen molecules can benefit from this invention. Shelf life of food and other perishable materials can be extended because of the presence of the macromolecular reducing agent, preferably activated by a catalyst at an appropriate time.

EXAMPLES

Examples 1-4: Preparation of Copolymer

Examples 1-4 concern the preparation of the copolymer from the base component and the unsaturated reducing component.

Each Example was prepared by pre-mixing 2.0 g of hydroxyl-terminated functionalized polybutadiene with 2.0 g of cyclic aliphatic monomer in a 25-ml vial, followed by placing that vial in an oil batch which had been preheated at 190° C. with stirring until the mixture in the vial became a homogenous solution, followed by adding 2-drops of catalyst and continuing the heated stirring for 10 minutes.

Table 3 shows the ingredients and the formulations.

TABLE 3

| Ingredient Name (Wt. %) | Ex. 1 | Ex. 2 | Ex. 3 | Ex. 4 |
|---|---|---|---|---|
| Lactide (Sigma-Aldrich) | 49.495 | | 49.495 | |
| Epsilon-caprolactone (Sigma-Aldrich) | | 49.495 | | 49.495 |

TABLE 3-continued

| Ingredient Name (Wt. %) | Ex. 1 | Ex. 2 | Ex. 3 | Ex. 4 |
|---|---|---|---|---|
| Hydroxyl-terminated functionalized polybutadiene (Mn = 2800) Polybd R-45HTLO from Sartomer Company of Exton, PA) | 49.495 | 49.495 | 49.495 | 49.495 |
| Titanium tetrakis(2-ethylhexanolate) (Tyzor ® TOT from Dorf Ketal) | 0.990 | 0.990 | | |
| Dibutyltin dibutoxide (FASCAT ® 4214 from Arkema) | | | 0.990 | 0.990 |
| Total | 100.00% | 100.00% | 100.00% | 100.00% |

Gel permeation chromatography (GPC) was used to analyze Examples 1-4 for conversion and molecular weight relative to polystyrene. The test was performed with the following materials: THF HPLC grade stabilized with 0.025% BHT; Waters GPC Columns: 2—Styragel HR5E THF (7.8×300 mm) and 1—Styragel HR 1 THF (7.7×300 mm); 0.45 μm Teflon™ syringe filters for sample filtration; Autosampler vials with crimp top and rubber seal with Teflon™ barrier; and Polystyrene narrow Mw standards (10): 7100000, 2110000, 1460000, 706000, 355000, 96400, 37900, 10850, 2980, 1050.

The samples were prepared as follows: Weighed ≈20 mg of sample (resin weight, record the weight) in a 30 ml vial. Added volumetrically, 20 ml of THF. Sealed vial and allowed to equilibrate overnight. Prior to analysis, heated in an 80° C. oven for 20 minutes, then cooled down. Filled a 3 ml disposable pipette with solution and attached the membrane filter. Discarded the first ml and filled an auto sampler file with solution. Crimped the seal.

The GPC Instrument had the following settings: THF solvent, 1 ml flow rate, 40 minute run time. Sample size, 50 μl. Refractive Index detector, 30° C., response—100 RIU full scale. Column oven was set at 30° C.

The GPC results appear in Table 4, along with melting temperature and glass transition temperatures determined by a TA Instrument DSC Q2000 instrument at a heating rate of 10° C./min under a $N_2$ atmosphere.

TABLE 4

| Polymerization Evidence of Copolymer | | | | |
|---|---|---|---|---|
| | Ex. 1 | Ex. 2 | Ex. 3 | Ex. 4 |
| GPC Analysis | | | | |
| Conversion | 93% | 97% | 99% | 96% |
| Mw | 9,250 | 9,650 | 9,490 | 8,710 |
| Mn | 20,440 | 20,150 | 17,380 | 19,990 |
| Mw/Mn | 2.21 | 2.095 | 2.048 | 1.951 |
| DSC Melt Temperature | | | | |
| ° C. | | 46.3 | | 47 |
| DSC Glass Transition Temperature | | | | |
| ° C. | −73.7 | −76.1 | −69.7 | −75 |
| ° C. | | −4.3 | | −7.7 |

GPC analysis showed that there was excellent conversion for all four reactions with polymerization of the cyclic aliphatic monomer and the polybutadiene. DSC melt and glass transition temperature results indicated that copolymer was being polymerized because of the differences between these temperatures and homopolymers of the two reactants.

It was surprising that copolymers of lactide monomer were liquids having two Tg values but no Tm even though the lactide monomer itself is a solid.

Further it was also surprising that copolymers of epsilon-caprolactone monomer were waxy solids having one Tg value and a Tm of about 47° C. because the epsilon-caprolactone itself is a liquid.

Differential Scanning calorimetry (DSC) was also then used for evaluating the performance of the copolymer as an oxygen scavenger. According to ASTM D385-06, the test method consists of heating a sample to an elevated temperature, and once equilibrium is established, changing the surrounding atmosphere from nitrogen to oxygen. For Examples 1-4, 120° C. was chosen. The time from the first exposure to oxygen until the onset of oxidation is considered the Oxidation Induction Time (OIT). Specific OIT measurement procedures were as follows:

1) Calibrated the calorimeter instrument for heat flow, gas ($O_2$ & $N_2$) flow rate at 50 cc/min, and thermometer;
2) Weighed 6-8 mg of sample in small pieces (cut if needed)
3) Purged the sample in sample cell with $N_2$ at flow rate of 50 cc/min for 15 min
4) Heated the samples at heating rate of 20° C./min to the setting temperature under $N_2$ atmosphere and record the heat flow
5) Held the temperature at the setting temperature for 10 min in $N_2$ and continued to record the heat flow
6) Switched from $N_2$ to $O_2$ at flow rate of 50 $cm^3$/min
7) Held the samples at the setting point constantly in $O_2$ and continued to record the heat flow for 100 min
8) Collected data of initial oxidation time and peak oxidation time.

Table 5 shows the OIT results for Examples 1-4.

TABLE 5

| OIT at 120° C. | | | | |
|---|---|---|---|---|
| Example | 1 | 2 | 3 | 4 |
| Start to oxidation (OIT), min | Immediate | 24.2 | Immediate | Immediate |
| Peak oxidation time, min | 38.2 | 71.2 | 21.2 | 48.2 |

The results of OIT demonstrated Examples 1, 3, and 4 were very fast to onset of oxidation, which can prove useful at 120° C. for those items requiring immediate scavenging for oxygen. However, for those products which are not stored at 120° C., these fast Examples 1, 3, and 4 were also believed to be useful for lower temperatures perhaps requiring the presence of a reaction catalyst such as cobalt stearate to be present.

The result of OIT for Example 2 demonstrated a faster onset of oxidation than that seen for the terpolymers of US2012100263, permitting one having ordinary skill in the art to select from different oxygen scavenging polymer systems for a variety of thermoplastic matrices for a variety of rates of oxygen scavenging effect.

It is also believed that the copolymers of the present invention can function in thermoplastic matrices to perform similarly in the experiments as performed in US2012100263, such as oxygen transmission rate (OTR), oxygen ingress at headspace for a water filled bottle, oxygen ingress in water for a water filled bottle, etc.

Therefore, without undue experimentation, one skilled in the art can compound increasing amounts of copolymer to achieve multiples of amounts of oxygen scavenging capacity to determine the rate of scavenging by the copolymer functioning as the reducing agent for oxygen molecules present or permeating over a number of months of shelf life for the plastic packaging article containing the perishable and consumable food or beverage.

The invention is not limited to the above embodiments. The claims follow.

What is claimed is:

1. A copolymer having carbon-carbon unsaturated bonds susceptible to reaction with oxygen molecules, comprising:
    a reactive extrusion polymerization product of cyclic aliphatic monomer and unsaturated functional polymer wherein the cyclic aliphatic monomer is selected from the group consisting of propriolactone, butyrolactone, valerolactone, caprolactone, cyclic carbonates, lactams, azlactones, and combinations thereof; wherein the cyclic aliphatic monomer is present in the copolymer in a weight percent ranging from about 40% to about 60% of the copolymer and wherein the unsaturated functional polymer is present in the copolymer in a weight percent ranging from about 40% to about 60% of the copolymer;
    wherein the copolymer has a weight average molecular weight (Mw) of about 15,000-20,000, a number average molecular weight (Mn) of about 8,500-10,000, and a polydispersity of from about 1.8 to about 2.2, all as measured via Gel Permeation Chromatography (GPC) using polystyrene as a test reference.

2. The copolymer of claim 1, wherein the cyclic aliphatic monomer is selected from the group consisting of cyclic carbonates, lactams, azlactones, and combinations thereof.

3. The copolymer of claim 1, wherein the unsaturated functional polymer is selected from the group consisting of hydroxyl-functional polyalkenes, hydroxyl-functional polyalkynes, glycidyl-functional polyalkenes or glycidyl-functional polyalkynes, and combinations thereof.

4. The copolymer of claim 1, wherein the cyclic aliphatic monomer is epsilon-caprolactone.

5. The copolymer of claim 1, wherein the unsaturated functional polymer is hydroxyl-terminated functionalized polybutadiene.

6. A thermoplastic compound, comprising: (a) a thermoplastic polymer matrix; and (b) a copolymer having carbon-carbon unsaturated bonds susceptible to reaction with oxygen molecules, wherein the copolymer comprises a reactive extrusion polymerization product of cyclic aliphatic monomer and unsaturated functional polymer wherein the cyclic aliphatic monomer is selected from the group consisting of propriolactone, butyrolactone, valerolactone, caprolactone, cyclic carbonates, lactams, azlactones, and combinations thereof;
    wherein the cyclic aliphatic monomer is present in the copolymer in a weight percent ranging from about 40% to about 60% of the copolymer and wherein the unsaturated functional polymer is present in the copolymer in a weight percent ranging from about 40% to about 60% of the copolymer;
    wherein the copolymer has a weight average molecular weight (Mw) of about 15,000-20,000, a number average molecular weight (Mn) of about 8,500-10,000, and a polydispersity of from about 1.8 to about 2.2, all as measured via Gel Permeation Chromatography (GPC) using polystyrene as a test reference.

7. The compound of claim 6, further comprising a catalyst for the copolymer functioning as a reducing agent for oxygen molecules.

8. The compound of claim 6, further comprising a functional additive selected from the group consisting of adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

9. The compound of claim 6, wherein the copolymer is present in an amount from about 0.1 to about 3 percent by weight of the compound.

10. The compound of claim 6, wherein the compound is in the form of a thermoplastic article.

11. The compound of claim 10, wherein the article is a bottle pre-form.

12. The compound of claim 10, wherein the article is a blow-molded bottle.

13. The compound of claim 12, wherein the bottle contains a perishable food or beverage susceptible to oxidation.

14. A method for scavenging for oxygen within a thermoplastic article, comprising:
    (a) mixing a reducing agent for oxygen molecules into a thermoplastic compound and
    (b) forming an article from the thermoplastic compound, wherein the reducing agent is a copolymer having carbon-carbon unsaturated bonds susceptible to reaction with oxygen molecules, wherein the copolymer comprises a reactive extrusion polymerization product of cyclic aliphatic monomer and unsaturated functional polymer wherein the cyclic aliphatic monomer is selected from the group consisting of propriolactone, butyrolactone, valerolactone, caprolactone, cyclic carbonates, lactams, azlactones, and combinations thereof;
    wherein the cyclic aliphatic monomer is present in the copolymer in a weight percent ranging from about 40% to about 60% of the copolymer and wherein the unsaturated functional polymer is present in the copolymer in a weight percent ranging from about 40% to about 60% of the copolymer;
    wherein the copolymer has a weight average molecular weight (Mw) of about 15,000-20,000, a number average molecular weight (Mn) of about 8,500-10,000, and a polydispersity of from about 1.8 to about 2.2, all as measured via Gel Permeation Chromatography (GPC) using polystyrene as a test reference.

15. The method of claim 14, wherein step (a) also includes mixing a catalyst into the thermoplastic compound.

16. The method of claim 14, wherein the copolymer reduces an oxygen molecule by reaction with a carbon-carbon unsaturated bond, thereby scavenging the oxygen molecule from the article.

* * * * *